(12) United States Patent
Baker

(10) Patent No.: US 10,953,961 B2
(45) Date of Patent: Mar. 23, 2021

(54) TECHNIQUES IN THE UPSTREAM OIL AND GAS INDUSTRY

(71) Applicant: Mirade Consultants Ltd., London (GB)

(72) Inventor: Timothy Robert Baker, Brighton (GB)

(73) Assignee: Mirade Consultants Ltd.

( * ) Notice: Subject to any disclaimer, the term of this patent is extended or adjusted under 35 U.S.C. 154(b) by 232 days.

(21) Appl. No.: 15/476,593

(22) Filed: Mar. 31, 2017

(65) Prior Publication Data
US 2017/0283014 A1 Oct. 5, 2017

(30) Foreign Application Priority Data
Apr. 1, 2016 (GB) .................................. 1605615

(51) Int. Cl.
| E21B 43/16 | (2006.01) |
| B63B 35/44 | (2006.01) |
| E21B 41/00 | (2006.01) |
| B63B 27/34 | (2006.01) |
| B63B 25/12 | (2006.01) |

(Continued)

(52) U.S. Cl.
CPC .............. *B63B 35/44* (2013.01); *B63B 25/12* (2013.01); *B63B 27/25* (2013.01); *B63B 27/34* (2013.01); *E02B 17/00* (2013.01); *E21B 41/0064* (2013.01); *E21B 43/01* (2013.01); *E21B 43/164* (2013.01); *E21B 43/40* (2013.01); *B63B 2035/4473* (2013.01); *B63B 2035/4486* (2013.01); *E02B 2017/0056* (2013.01); *Y02C 20/40* (2020.08); *Y02P 90/70* (2015.11)

(58) Field of Classification Search
CPC .............................. E21B 43/16; E21B 43/164
See application file for complete search history.

(56) References Cited

U.S. PATENT DOCUMENTS

| 2,008,309 | A | * | 7/1935 | Maiuri | ................... F25J 1/0027 |
| | | | | | 62/606 |
| 4,593,763 | A | | 6/1986 | Burke | |

(Continued)

FOREIGN PATENT DOCUMENTS

WO 2014/015307 1/2014

OTHER PUBLICATIONS

"Ship transport of CO2 for Enhanced Oil Recovery—Literature Survey" by Dr. Peter Brownsort, Scottish Carbon Capture & Storage, Jan. 2015.*

(Continued)

*Primary Examiner* — Steven A MacDonald
(74) *Attorney, Agent, or Firm* — Conley Rose, P.C.

(57) ABSTRACT

$CO_2$ in the liquid or super-critical state is delivered by at least one carrier vessel from at least one $CO_2$ storage site, which may be an onshore site, to an integrated offshore facility. The integrated offshore facility is provided with at least one on-site storage tank or vessel adapted to store $CO_2$ in the liquid or super-critical state and with equipment for marine transfer of $CO_2$ in the liquid or super-critical state. $CO_2$ is utilised as required from said at least one on-site storage tank or vessel for EOR at said offshore site or for EGR at said offshore site by injection into a sub-sea oil or natural gas bearing reservoir and recovery of oil and/or natural gas from a resulting production stream.

7 Claims, 5 Drawing Sheets

(51) Int. Cl.
*B63B 27/25* (2006.01)
*E02B 17/00* (2006.01)
*E21B 43/01* (2006.01)
*E21B 43/40* (2006.01)

(56) References Cited

U.S. PATENT DOCUMENTS

| | | | | |
|---|---|---|---|---|
| 4,607,699 | A | 8/1986 | Stephens | |
| 4,695,201 | A * | 9/1987 | Beskow | E02B 17/00 114/296 |
| 4,907,912 | A * | 3/1990 | Smith | E02B 17/021 141/82 |
| 6,517,286 | B1 * | 2/2003 | Latchem | F17C 1/007 166/335 |
| 7,179,144 | B2 * | 2/2007 | De Baan | B63B 27/24 114/230.12 |
| 2003/0051875 | A1 * | 3/2003 | Wilson | B65G 5/005 166/268 |
| 2005/0061396 | A1 * | 3/2005 | Landry | F17C 7/04 141/388 |
| 2006/0254769 | A1 * | 11/2006 | Wang | E21B 43/16 166/266 |
| 2007/0095427 | A1 * | 5/2007 | Ehrhardt | B63B 21/507 141/387 |
| 2008/0256959 | A1 * | 10/2008 | Aspelund | F17C 9/00 62/48.1 |
| 2009/0032248 | A1 * | 2/2009 | Svoboda | C10L 3/108 166/249 |
| 2010/0251763 | A1 * | 10/2010 | Audun | F25J 1/0278 62/614 |
| 2010/0276146 | A1 * | 11/2010 | Smith | E21B 43/16 166/302 |
| 2011/0272137 | A1 * | 11/2011 | Araya | C09K 8/58 166/90.1 |
| 2012/0181041 | A1 * | 7/2012 | Willman | E02F 3/925 166/357 |
| 2013/0043678 | A1 * | 2/2013 | Saar | F02C 1/005 290/2 |
| 2013/0266380 | A1 * | 10/2013 | Capron | E21B 41/0064 405/184.4 |
| 2013/0292128 | A1 * | 11/2013 | Brinkmann | E21B 43/01 166/344 |
| 2014/0130498 | A1 * | 5/2014 | Randolph | E21B 43/24 60/645 |
| 2014/0299039 | A1 * | 10/2014 | Trollux | B63B 25/14 114/74 R |
| 2014/0338921 | A1 * | 11/2014 | Barry | E21B 43/16 166/369 |
| 2014/0345299 | A1 * | 11/2014 | Kirk | B63B 35/00 62/53.2 |
| 2015/0090117 | A1 * | 4/2015 | Baggerud | C10L 3/102 95/30 |
| 2015/0096760 | A1 * | 4/2015 | Millheim | E21B 43/12 166/350 |
| 2016/0009353 | A1 * | 1/2016 | Cooper | B63B 21/507 701/21 |
| 2016/0053594 | A1 * | 2/2016 | Nazarian | C09K 8/58 166/263 |
| 2016/0318585 | A1 * | 11/2016 | Knutsen | B63B 22/023 |
| 2017/0101857 | A1 * | 4/2017 | Lewis | E21B 43/122 |
| 2017/0167787 | A1 * | 6/2017 | Pierre, Jr. | F25J 1/0015 |
| 2017/0183835 | A1 * | 6/2017 | Lee | E02B 17/02 |

OTHER PUBLICATIONS

"Conceptual Design of CO2 Transportation System for CCS" Suzuki, Energy Procedia 37 ( 2013) 2989-2996.*
EP Search Report for GB Application No. 1705291.1 dated Jul. 26, 2017 (5 pages).

* cited by examiner

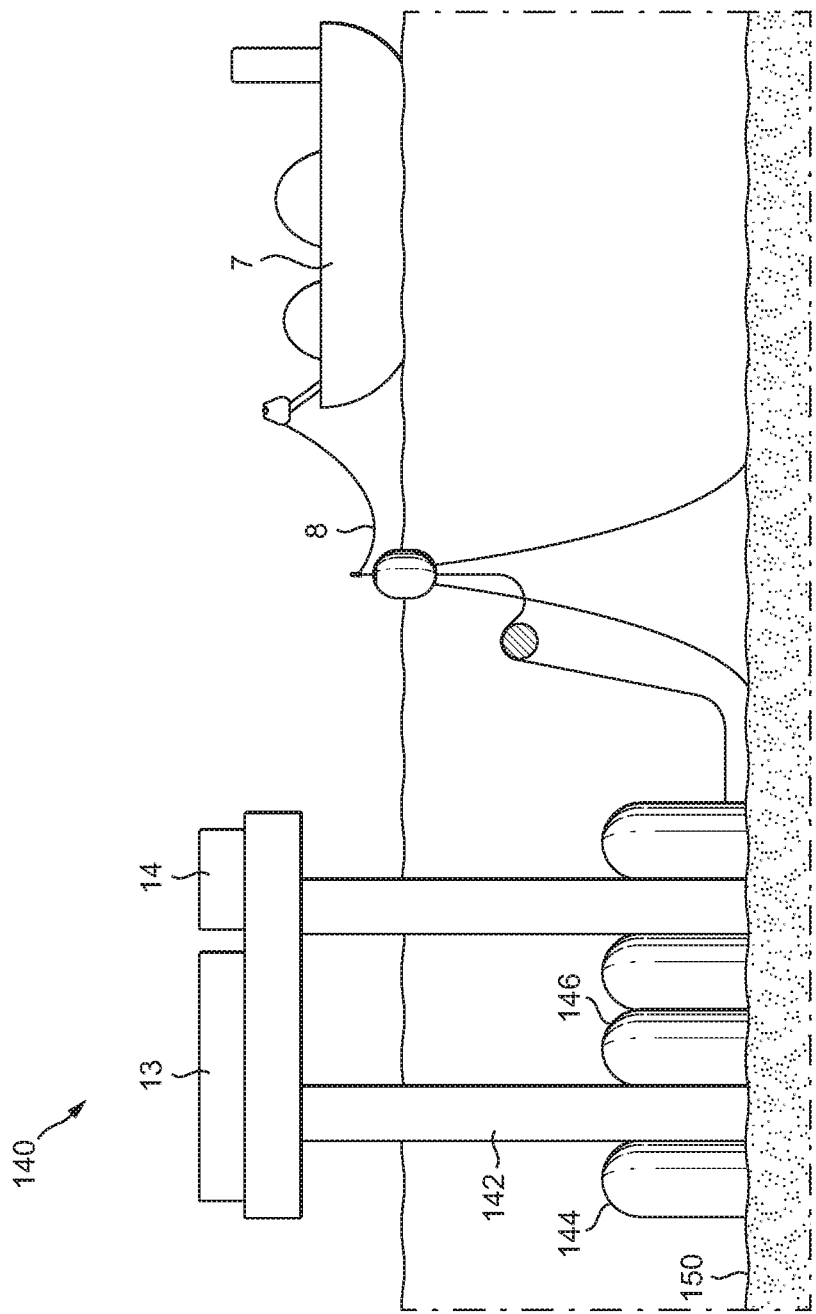

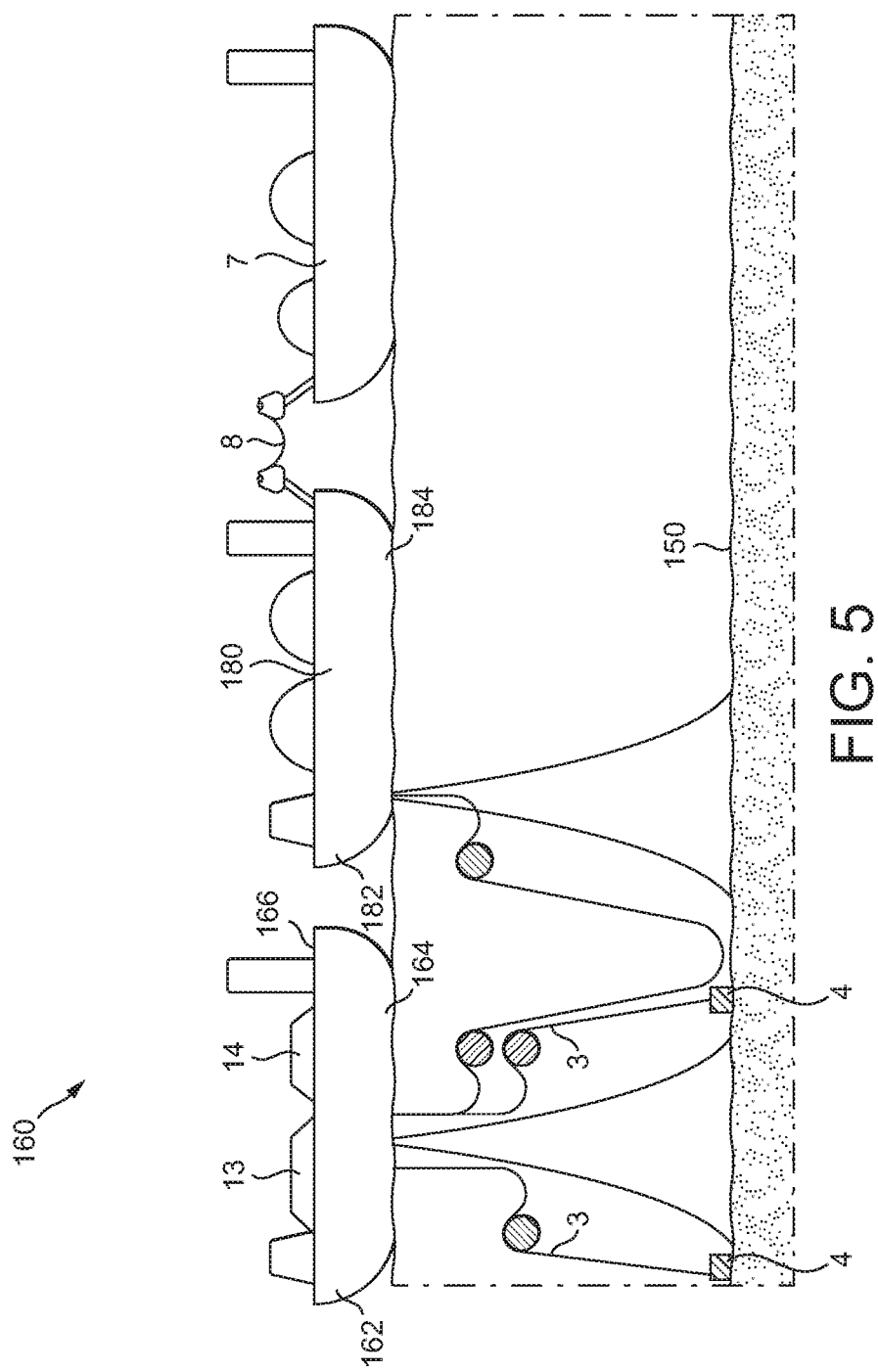

TECHNIQUES IN THE UPSTREAM OIL AND GAS INDUSTRY

CROSS REFERENCE TO RELATED APPLICATION

The present application claims priority to British Patent Application No: 1605615.2, filed with the UK Intellectual Property Office on Apr. 1, 2016, the entire contents of which are incorporated herein by reference.

FIELD OF THE DISCLOSURE

This disclosure relates to the upstream oil and gas industry. More particularly we disclose methods and apparatus for offshore $CO_2$-based enhanced oil recovery (hereafter: "EOR"), or for offshore $CO_2$-based enhanced gas recovery (hereafter: "EGR").

BACKGROUND

EOR and EGR techniques of various kinds may be used to increase the production rates and recovery factors of oil or natural gas from a reservoir. $CO_2$-based EOR or EGR techniques, in which $CO_2$ is injected into a reservoir, particularly one that is already significantly depleted, have been proposed for use to enhance recovery of liquid or gaseous hydrocarbons, as have Water Alternating Gas (hereafter: "WAG") techniques that employ injected water and gas, if appropriate, $CO_2$, alternately. WAG techniques employing $CO_2$ should be regarded as a sub-set of $CO_2$-based EOR or EGR techniques.

While a number of onshore oil fields, particularly in the United States and Canada, have benefitted from $CO_2$ based EOR techniques, application of $CO_2$ injection to offshore oil and gas fields is more problematic, and has necessitated a ready supply of $CO_2$ gas available through removal of $CO_2$ from the hydrocarbon production stream.

The potential technical and economic benefits of $CO_2$-based EOR are well publicised, and could apply to $CO_2$-based EGR (See, for example: "Economic Impacts of CO2-Enhanced Oil Recovery for Scotland", Pershad et al., July 2012, Element Energy Ltd and Heriot Watt University for Scottish Enterprise). These include improved hydrocarbon production rates—particularly in mature oil and natural gas fields, and improved hydrocarbon recovery factors (the proportion of oil/gas in the reservoir that it is technically and economically viable to produce).

However, application of $CO_2$-based EOR/EGR to offshore oil/gas fields has been limited to date by a number of factors, which are further discussed below, namely:
  Lack of availability of $CO_2$ offshore.
  Variations in $CO_2$ quantities required through time.
  Inability to match $CO_2$ supply and demand.
  Difficulties with the application of $CO_2$ to existing production facilities.
  Limited remaining life of ageing assets.
  Access of small and/or remote oil/gas fields to a $CO_2$ supply.

As a result of these issues, numerous opportunities for $CO_2$-based EOR/EGR have been missed (both with respect to existing oil/gas assets and new ones).

The quantity of $CO_2$ required to achieve viable enhanced hydrocarbon recovery is significant, and has been estimated to be of the order of 0.4 tonnes of $CO_2$ per barrel of incremental oil production ["The Economics of $CO_2$-EOR Cluster Developments in the UK Central North Sea/Outer Moray Firth", Prof. Alexander Kemp et al, Dept. of Economics, University of Aberdeen: North Sea Study Occasional Paper No: 123, January 2012]. Thus, for even a modest incremental oil production rate, the quantity of $CO_2$ required would be appreciable.

In order to make use of $CO_2$-based EOR/EGR, in addition to plant and equipment to inject the $CO_2$, the hydrocarbon production facility would need the following:
  Plant and equipment to separate the $CO_2$ from production streams and to treat it as necessary.
  Machinery to compress the 'recycled' $CO_2$ stream in preparation for pumping and reinjection.
  Acid gas capability to be in the material specifications etc. throughout much of the facility.

For existing facilities, these will either be non-existent (native hydrocarbon stream did not contain appreciable $CO_2$) or insufficient (way below the substantial handling capability required for $CO_2$-based EOR/EGR). As a result, it has generally been considered that $CO_2$-based EOR/EGR cannot be applied at an existing hydrocarbon facility without expansive modifications and additions to the plant. Taking an incremental oil extraction rate of 30000 barrels per day, as an example, by Prof. Alexander Kemp et al's estimate supra, around 12000 tonnes of $CO_2$ would be required per day. Once separated from the produced fluids, 'recycled' $CO_2$ will be in the gaseous state. The design volumetric flow capacities of plant, for example vessels and pipework, will have to take account of this. In addition, compression machinery with the requisite capability (driver power, pressure ratio and volumetric flow) will need to be in place. For the application of $CO_2$-based EOR/EGR to an existing offshore asset, it is unlikely that the weight and footprint of all the new plant required could be accommodated by the topsides of an existing facility. It is possible that new jackets (for example: a new bridge-linked platform) or new floating facilities would have to be installed. Such capital-intensive modifications would quite likely make the scheme unviable for older assets—more so for an asset in production decline.

$CO_2$-based EOR/EGR would theoretically be a particularly attractive proposition technically for ageing oil/gas fields where production rates have declined. However, while these techniques have the potential to defer end of field life, the asset life extension may be short when viewed in the light of the capital expense of modifications and additions that may be required to the existing facility as discussed above. New plant installed on fixed jackets or fixed gravity base structures together with the $CO_2$ transport pipelines would not be an attractive investment.

For a production facility that is small or remote, unless there is existing $CO_2$ availability, the expenditure required for $CO_2$-based EOR or EGR is likely to be an unattractive prospect.

The transport of $CO_2$ to offshore hydrocarbon facilities by ship has been previously considered ["Ship Transport of $CO_2$ for Enhanced Oil Recovery-Literature Survey", Dr Peter Brownsort, Scottish Carbon Capture & Storage, January 2015], but this study did not address important issues that have a major effect on whether ship transport would provide a viable alternative. In particular, the lack of any suggestion for providing onsite $CO_2$ storage capability in Dr Brownsort's study, would mean that:
  The rate of unloading $CO_2$ from the tanker would have to match the required rate of injection of the supplied $CO_2$.
  Hydrocarbon production would be vulnerable to interruptions in the supply of supplied $CO_2$ which could result from something as routine as delays in the $CO_2$ tanker schedule due to bad weather.

For all of the above reasons, heretofore $CO_2$-based EOR or EGR has not been seen as a financially viable prospect for offshore facilities.

SUMMARY OF THE DISCLOSURE

The teachings of the present disclosure aim to mitigate or overcome these problems.

In accordance with a first aspect of this disclosure, a method is provided for offshore $CO_2$-based EOR or for offshore $CO_2$-based EGR, in which method: $CO_2$ in a state selected from the liquid and super-critical states is delivered by at least one carrier vessel from at least one $CO_2$ storage site to an integrated offshore facility provided with at least one on-site storage means, selected from tanks and vessels, adapted to store $CO_2$ in said state and with equipment for marine transfer of $CO_2$ in said state; and $CO_2$ is utilised as required from said at least one on-site storage means for EOR at said offshore site or for EGR at said offshore site by injection into a sub-sea oil or natural gas bearing reservoir and recovery of oil and/or natural gas from a resulting production stream.

It will readily be appreciated by persons skilled in this field that a storage tank adapted to store $CO_2$ in the liquid or super-critical state must be a tank specific for this purpose and not just a conventional oil or natural gas storage tank that is re-utilised for $CO_2$.

According to a second and alternative aspect of this disclosure, apparatus for offshore $CO_2$-based EOR or for offshore $CO_2$-based EGR comprises: an integrated offshore facility provided with:

at least one on-site storage tank or vessel adapted to store $CO_2$ in the liquid or super-critical state, and equipment for marine transfer of $CO_2$ in the liquid or super-critical state, equipment for injecting $CO_2$ into a sub-sea oil field for EOR or into a sub-sea gas field for EGR; and equipment for recovering oil and/or gas from a resulting production stream;

and at least one carrier vessel adapted to deliver $CO_2$ in the liquid or super-critical state from at least one $CO_2$ storage site to the said integrated offshore facility.

The at least one $CO_2$ storage site is preferably an onshore site, but may also be or include an integrated offshore facility provided with at least one on-site storage tank or vessel adapted to store excess $CO_2$ derived from a production stream at said facility, the CO2 being stored in the liquid or super-critical state.

The integrated offshore facility may comprise one of a concrete gravity-based structure located in fixed position by the ballasted weight of the structure resting on the seabed, and a steel gravity based structure in which the topsides are supported by a combined tank and steel jacket which is located on the seabed by virtue of ballasted tanks capable of being emptied to allow the structure to be floated for relocation; and the said on-site storage tanks adapted to store $CO_2$ in the liquid or super-critical state are separate from any ballasted tanks and provided in the ballasted structure or mounted on the seabed.

Alternatively, the integrated offshore facility comprises a floating structure comprising one of (a) a floating production storage and offloading structure in which a marine vessel has a hull and a deck, the hull being one of a ship-like shape and a generally cylindrical shape and being provided with oil storage tanks therewithin for periodic offloading of oil to an oil tanker, and the deck being provided with hydrocarbon processing equipment, (b) a floating natural gas structure having a hull and a deck, and comprising a vessel-based natural gas production facility provided with topsides plant comprising natural gas liquefaction plant on its deck and liquefied natural gas storage tanks in its hull for periodic offloading to a liquefied natural gas tanker, (c) a spar tethered to the seabed and comprising a deep vertically oriented cylindrical section located below the waterline and a floating platform supported by the cylindrical section and comprising topsides including oil production facilities, oil storage tanks being located within the vertical cylindrical section for periodic unloading to an oil tanker, (d) a semi-submersible structure comprising a buoyant platform provided with ballasted tanks for oil or liquefied natural gas located below the waterline, the semi-submersible structure being tied to the seabed, and (e) a tension leg platform in which a buoyant platform is located by mooring tethers in tension to ensure its vertical position relative to the seabed; and the said storage tanks adapted to store $CO_2$ in the liquid or super-critical state are provided in the floating structure.

In a further alternative, the integrated offshore facility comprises a jack-up structure in which a barge type production platform provided with legs and towed to a selected position is jacked up on the said legs either directly from the seabed or from a ballasted steel tank located on the seabed, and the said storage tanks adapted to store $CO_2$ in the liquid or super-critical state are provided in one of the barge and the ballasted tank.

In a yet further alternative, the integrated offshore facility is provided with a separate floating storage and offloading vessel without oil or gas production facilities, the vessel being provided with the said storage tanks adapted to store $CO_2$ in the liquid or super-critical state.

In other words, the integrated offshore facility may either be such a facility, such as an oil platform, in which the $CO_2$ storage tanks are integrated into the facility proper (that is: the platform in this example) or a facility in which the $CO_2$ tanks are integrated into a separate floating storage and offloading vessel. In a preferred embodiment of this arrangement, the separate vessel is provided both with plant and equipment which has the capability to process $CO_2$-laden hydrocarbon production streams, separate $CO_2$ from production fluids, and process and apply the necessary pressure and temperature regulation to $CO_2$ so that it reaches the liquid or super-critical state; and with plant and equipment to achieve the requisite $CO_2$ pressure and temperature for injection into the a sub-sea oil field or a sub-sea natural gas field. This arrangement enables EOR or EGR to be employed at an existing offshore facility not originally designed to use such technology, and in particular such a facility with limited reserves and/or low production rates, and/or which is operating near to the end of its field life while avoiding capital expenditure on fixed structure that would not be viable, thereby extending the life of or enhancing the production capacity of an otherwise largely depleted offshore hydrocarbon reservoirs as well as achieving a measure of carbon sequestration, and all without the need to install $CO_2$ transport pipelines. When no longer required, the separate floating storage and offloading vessel may simply be towed away for use elsewhere.

Delivery of $CO_2$ to the integrated offshore facility by ship enables cost limiting factors relating to pipeline transport to be overcome. Storage of $CO_2$ on-site in storage tanks or vessels provided at the offshore facility frees the carrier vessel from having to inject $CO_2$ directly therefrom into the sub-sea oil or natural gas field at the rate and at the time such injection is required, allowing more efficient use of carrier vessels, as transfer rates and timing for $CO_2$ transfer from the carrier vessel is not dictated by the injection regime. In addition, since optimum conditions for injection differ from those associated with storage and transport of $CO_2$, higher temperature and higher pressure generally being required, better results can be achieved if the injection equipment is located at the off-shore facility rather than on the carrier vessel, since $CO_2$ may be drawn from the storage tank or vessel on the offshore facility at the required rate and injected at the temperature and pressure required. The capital cost of the carrier vessel is also reduced. As compared with direct injection from the carrier vessel, injection from storage tanks or vessels at the offshore facility avoids injection interruptions and consequent interruption in oil or natural gas production resulting from stopping and starting producing wells and other topsides plant and equipment, all caused by gaps between carrier deliveries or carrier delays due, for example, to bad weather.

Integrated offshore oil or natural gas facilities as defined above are believed novel and inventive in their own right. Accordingly, we provide, in a third alternative aspect of this disclosure, an integrated offshore oil or natural gas facility provided with:

at least one on-site storage tank or vessel adapted to store $CO_2$ in the liquid or super-critical state, with equipment for marine transfer of $CO_2$ in the liquid or super-critical state, equipment for injecting $CO_2$ into a sub-sea oil field for EOR or into a sub-sea natural gas field for EGR; and equipment for recovering oil and/or natural gas from a resulting production stream.

Preferably, the integrated offshore oil or natural gas facility is additionally provided both with plant and equipment which has the capability to process $CO_2$-laden hydrocarbon production streams, separate $CO_2$ from production fluids, and process and apply the necessary pressure and temperature regulation to $CO_2$ so that it reaches the liquid or super-critical state; and with plant and equipment to achieve the requisite $CO_2$ pressure and temperature for storage in said at least one on-site storage tank or vessel or for injection into the sub-sea oil field or the sub-sea natural gas field.

BRIEF DESCRIPTION OF THE DRAWINGS

Reference will now be made to the description of various embodiments by way of example only with reference to the accompanying drawings, in which:—

FIGS. 4, 5 are schematic views of additional embodiments of offshore facilities and carrier vessels, with distances fore-shortened for ease of illustration.

DETAILED DESCRIPTION

Figure 1:
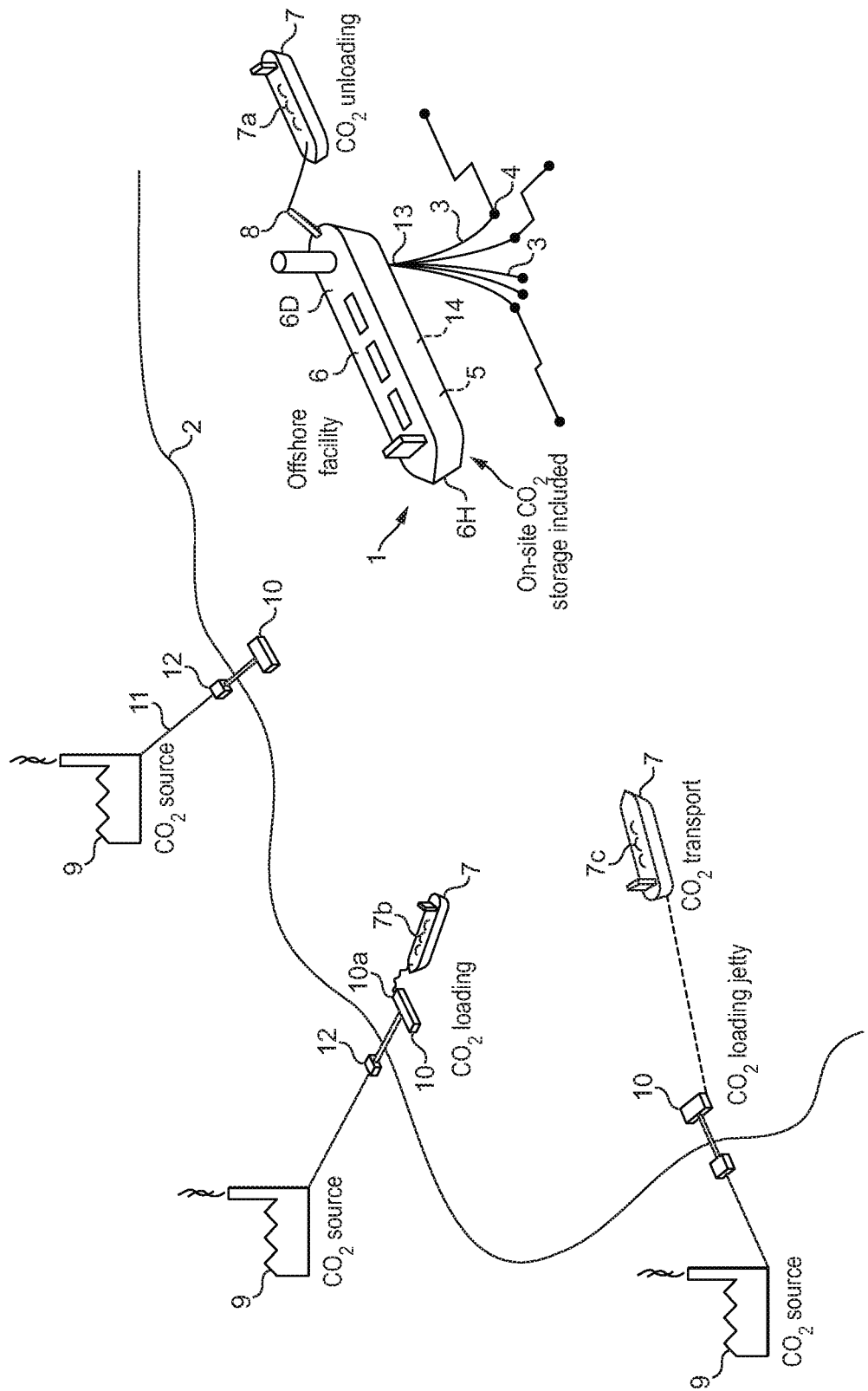
FIG. 1 is a schematic view of a plurality of onshore CO2 producers, a representative integrated offshore facility, and a plurality of carrier vessels.

An integrated offshore facility is schematically illustrated at 1 in FIG. 1. Distances are shown fore-shortened for ease of illustration. In practice, offshore oil and natural gas facilities are commonly located many miles from the shoreline 2, especially in the North Sea. The illustrated offshore facility is of the MOPU (Mobile Offshore Production Unit) type, linked by risers 3 to a plurality of sub-sea wellheads 4, but may take any of the conventional forms for offshore oil or natural gas facilities as explained in more detail below. In the embodiment of FIG. 1, the floating unit illustrated comprises a floating oil and/or natural gas structure or marine vessel 6 that includes a hull 6H and a deck 6D, where the marine vessel 6 incorporates at least one, and preferably a plurality of, storage tanks 5 for storing CO2 in the liquid or super-critical state within the hull 6H of the floating unit. One 7a Out of a Fleet of Carrier Vessels 7 is Shown Unloading Liquid or Super-Critical CO2 from that vessel to the storage tanks 5 employing equipment 8 for marine transfer of CO2 in the liquid or super-critical state located on the floating unit.

A plurality of onshore $CO_2$ producers 9, which may, for example, comprise power stations or large industrial complexes, are associated with $CO_2$ loading jetties 10 along the shoreline. The producers 9 may be so associated by pipelines 11 for gaseous, liquid or super-critical $CO_2$ and/or by other means of transport such as road or rail tankers operating along rail or road networks between the producers 9 and the jetties 10 to transport $CO_2$ from the producer sites 9 to the jetties 10.

A fleet of $CO_2$ carrier vessels 7, enable simultaneous loading (shown by carrier 7b at jetty 10a), transport from jetty to offshore facility (shown by carrier 7c) and off-loading (shown by carrier 7a) at the offshore facility, so that a sufficient supply of $CO_2$ in liquid or super-critical state is always available at the offshore facility 1. We envisage that, in practice, there would be a large fleet of carrier vessels 7 serving a number of offshore facilities 1. At or adjacent the jetties 10, storage tanks 12 are suitably provided, and these may be associated with a plant for converting gaseous $CO_2$ delivered to the jetty facility into liquid or super-critical form before it is loaded into the carrier vessels.

The offshore facility 1 is provide with equipment 13 for injecting $CO_2$ into a sub-sea oil field for EOR, into a sub-sea natural gas field for EGR, or into a condensate field (being a field intermediate between an oil field and a natural gas field, in which an appreciable amount of liquid is effectively present in vapour or fine droplet form within gas) for EOR and/or EGR.

Equipment 8 for marine transfer of $CO_2$ will be generally similar to equipment for marine transfer of oil or of liquefied natural gas, and no further details should be required for a person with skills in these fields to select, purchase or fabricate suitable such equipment. Similarly, EOR and EGR are known techniques, and persons with skills in these fields will be familiar with the kinds of equipment 13 required for injecting $CO_2$ into a sub-sea oil field, into a sub-sea natural gas field, or into a sub-sea condensate field. Similarly, equipment for the separation of $CO_2$ from hydrocarbon production streams, and for subsequent $CO_2$ treatment are also known per se. Accordingly, no detailed description of plant and equipment to separate and process $CO_2$, or to raise the pressure and regulate the temperature of the $CO_2$ to match the required injection conditions, or of the associated technologies such as compressors, pumps, coolers, or control systems, is deemed necessary.

Figure 3:
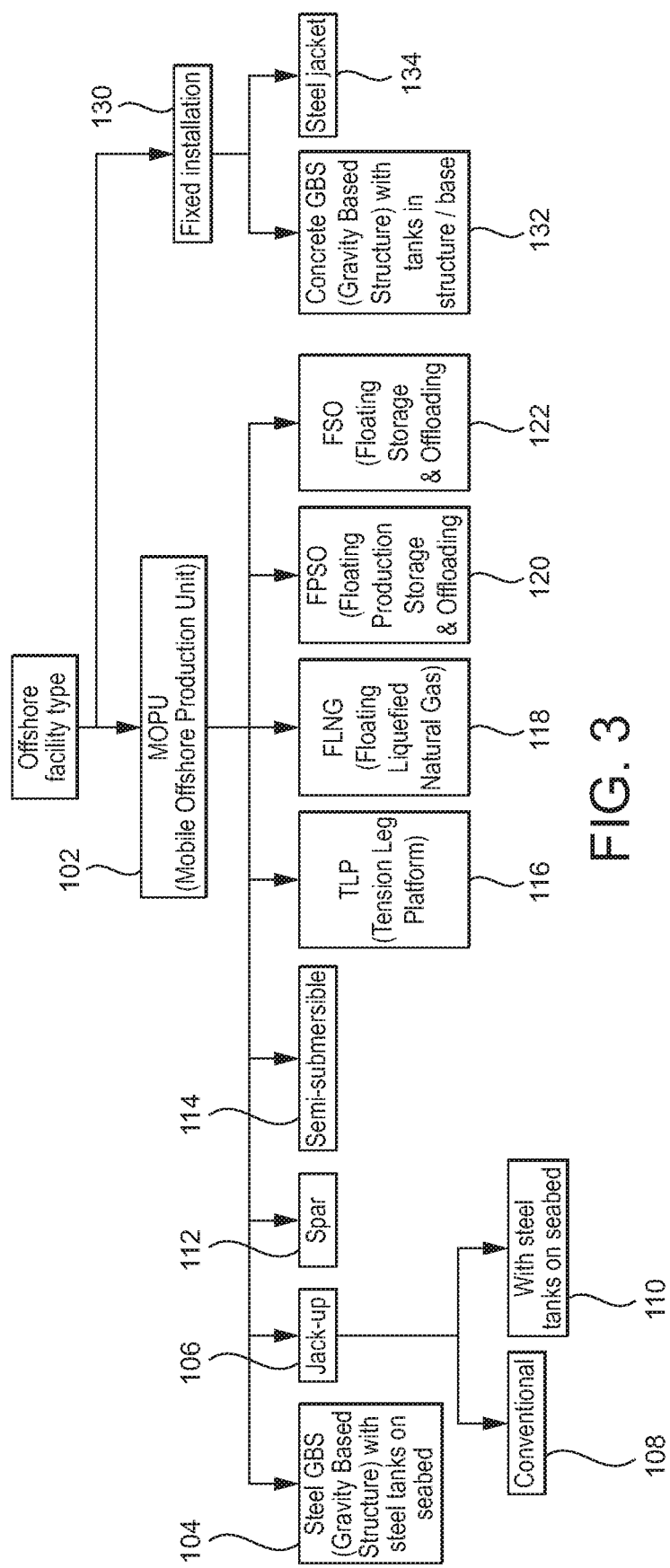
FIG. 3 illustrates how different forms of offshore facility may be classified.

The offshore facility may comprise one of many different structures, as explained above, and as classified in FIG. 3. In accordance with the teachings of this disclosure, the offshore facility may comprise a mobile offshore production unit 102 such as a steel gravity based structure (GBS) with steel tanks on the sea-bed 104, a Jack-Up structure 106 such as a conventional jack-up 108 or a jack-up with steel tanks on the sea-bed 110, a Spar, 112, a semi-submersible structure 114 comprising a base and a tank positioned in the base capable of storage of liquid or super-critical $CO_2$, a tension leg platform (TLP) 116, a floating liquefied natural gas (FLNG) structure 118, a floating production storage and offloading (FPSo) structure 120, and a floating storage and offloading (FSO) offshore structure 122, In some embodiments, the offshore facility comprises a fixed installation 130 such as a concrete GBS 132 provided with equipment capable of marine transfer of $CO_2$ and with storage tanks suitable for storing liquid or super-critical $CO_2$, and a steel jacket GBS structure 134. In some embodiments, the concrete GBS 132 is located in a fixed position by the ballasted weight of the concrete GBS 132 resting on the seabed. A separate floating storage vessel is suitably provided at the offshore facility when it is a Conventional Jack-Up, TLP, or Steel Jacket.

In some embodiments, a barge type production platform is provided in jack-up structure 106 with legs and towed to a selected position is jacked up on the said legs directly from the seabed or from an optional ballasted steel tank located on the seabed, and the said storage tanks adapted to store $CO_2$ in said state are provided in one of the barge and the optional ballasted tank. In some embodiments, the spar 112 is tethered to the seabed and comprises a vertically oriented cylindrical section located below the waterline and a floating platform supported by the cylindrical section, and comprises topsides including oil production facilities, oil storage tanks being located within the vertical cylindrical section for periodic unloading to an oil tanker. In certain embodiments, the semi-submersible structure 114 comprises a buoyant platform provided with ballasted tanks for oil or liquefied natural gas located below the waterline, the semi-submersible structure 114 being tied to the seabed. In certain embodiments, a buoyant platform is located in the TLP 116 by mooring tethers in tension to ensure its vertical position relative to the seabed. In each of the aforesaid structures, storage tanks adapted to store $CO_2$ in said state are provided within the floating structure. In certain embodiments, the steel jacket GBS structure 134 comprises a structure 134 in which topsides are supported by a combined tank and steel jacket which is located on the seabed by virtue of ballasted tanks capable of being emptied to allow the structure to be floated for relocation.

Referring briefly to FIG. 4, an embodiment of an offshore facility 140 and a carrier vessel 7 are shown. In the embodiment of FIG. 4, offshore facility 140 comprises a GBS 142, such as a concrete GBS or a steel GBS having a steel jacket. GBS 142 of offshore facility 140 includes a ballasted tank 144 and an on-site subsea storage tank 146 each located at a seabed 150. Subsea storage tanks 146 of offshore facility store $CO_2$ in the liquid or super-critical state at the seabed 150. A carrier vessel 7 may unload liquid or super-critical $CO_2$ to subsea storage tanks 146 via equipment 8 for marine transfer of $CO_2$.

A separate vessel, not unlike that shown at 1 in FIG. 1, but tethered alongside a pre-existing oil or natural gas facility (including previously de-commissioned such facilities) is particularly suitable when that facility is one not originally designed to use $CO_2$-based EOR or $CO_2$-based EGR technology, and in particular such a facility with limited reserves and/or low production rates, and/or which is operating near to the end of its field life. For example, referring briefly to FIG. 5, an offshore facility 160 is shown that includes a production vessel or facility 162 and a separate storage and/or offloading vessel 180. In the embodiment of FIG. 5, production vessel 162 comprises a hull 164 and a deck 166 upon which plant and equipment 14 for processing $CO_2$ and equipment 13 for injecting $CO_2$ are positioned. In some embodiments, the plant and equipment 14 achieve the requisite CO2 pressure and temperature for storage in said at least one on-site storage means or for injection into the sub-sea oil field or the sub-sea natural gas field. The separate storage vessel 180 comprises a hull 182 and storage tanks 184 positioned within hull 182 for storing liquid or super-critical $CO_2$. A carrier vessel 7 may unload liquid or super-critical $CO_2$ to storage tanks 184 via equipment 8 for marine transfer of $CO_2$. In other embodiments, by providing the separate vessel with equipment 8 for marine transfer of $CO_2$ as well as storage tanks for liquid or super-critical $CO_2$, with plant and equipment for processing $CO_2$-laden production streams, separation and treatment of separated $CO_2$, conversion of gaseous $CO_2$ to conditions required in readiness for injection, and with equipment 13 required for injecting $CO_2$ into a sub-sea oil field for EOR or into a sub-sea natural gas field for EGR, this avoids the need to provide such equipment 8 and/or equipment 13 on the original offshore facility. When such new plant and equipment is provided on a separate vessel, it will have acid gas capability which may not have been included in the specifications of the original offshore facility.

In the case of EOR or EGR in an existing oil or natural gas field, following an initial stage in which the sub-sea oil or natural gas field will be charged with $CO_2$, $CO_2$ will emerge entrained in the oil or natural gas produced from the field. Whether provided on the facility itself or on the separate vessel discussed above and tethered alongside the original facility, plant and equipment 14 should also be provided which has the capability to process $CO_2$-laden production streams, separate $CO_2$ from the production fluids, and process and apply the necessary pressure and temperature regulation to separated $CO_2$ so that it reaches the liquid or super-critical state, and can be reinjected into the sub-sea oil or natural gas field together with such quantity of fresh liquid or super-critical $CO_2$ supplied from the carrier vessels and stored in tanks on the facility itself or on the separate vessel, if present, needed to make up the quantity of $CO_2$ required at any time. Equally well, $CO_2$ separated from production streams by appropriate plant and equipment of the kind employed in existing hydrocarbon production facilities utilising $CO_2$-based EOR or EGR may be employed to separate and process $CO_2$ from the production stream and pass it to the on-site $CO_2$ storage tanks for injection at a later time. Such plant and equipment should be familiar to persons skilled in this field. Accordingly, no further detailed description of the separators, compressors, pumps, control systems, etc., employed in such plant and equipment is deemed necessary.

The United Kingdom and Norwegian sectors of the North Sea would particularly benefit from the technologies disclosed herein. These areas have a number of mature fields whose yield of oil and natural gas is declining, but which have relative proximity to European countries with power-intensive economies (many $CO_2$ sources) and numerous sea ports that can serve as $CO_2$ loading points. It will readily be appreciated that the methods herein described and the apparatus herein described, have the incidental benefit that, in operation, significant quantities of $CO_2$ is sequestered in the sub-sea reservoir.

The storage required at offshore facilities when the teachings of the present disclosure are applied is illustrated by the calculation below, by way of example.

As explained above, it has been estimated by Kemp et al that of the order of 0.4 tonnes of $CO_2$ per incremental additional barrel of produced oil is required for EOR.

Reference may also be made to "A New Equation of State for Carbon Dioxide Covering the Fluid Region from the Triple-Point Temperature to 1100° K at Pressures up to 800

MPa", Span et al, J. Phys. Chem. Vol 25, No: 6, 1996, for a discussion of the states of $CO_2$.

In the light of Kemp's estimate, for an incremental oil rate of 30000 barrels per day, it would be necessary to inject 12000 tonnes/day of $CO_2$. Liquid $CO_2$ typically has a temperature of –53° C., a pressure of 7.5 bars absolute, and a density of 1166 kg/m$^3$. Super-critical $CO_2$ typically has a temperature of 37° C., a pressure of 80 bars absolute, and a density of 328 kg/m$^3$. It can readily be seen from this that the daily quantity of $CO_2$ required would occupy 10292 m$^3$ in the liquid state and 36585 m$^3$ in the super-critical state.

Given the significant differences in density and required pressure between $CO_2$ in the liquid and super-critical states, storage in the liquid rather than the super-critical state has the advantage that the storage vessels or tanks would not need to be so large or to be pressurised to so high an extent. Moreover, compliance with Health & Safety requirements would likely be less challenging. However, optimisation of design of the offshore facility with respect to cost, footprint, operability and availability may make it advantageous to store at least some of the $CO_2$ in the super-critical state for at least part of the time. Accordingly, the "at least one on-site storage tank or vessel adapted to store $CO_2$ in the liquid or super-critical state" required by the present disclosure may encompass a variety of different possibilities, including: one or more tanks and/or vessels for storing liquid $CO_2$; one or more tanks and/or vessels for storing $CO_2$ in the super-critical state; and one or more tanks and/or vessels for storing liquid $CO_2$ as well as one or more tanks and/or vessels for storing $CO_2$ in the super-critical state.

Long-term, a portion of the injected $CO_2$ will be made up of gas that was previously injected ('recycled' $CO_2$). This 'recycled' $CO_2$ will be entrained with the oil or natural gas produced, and, when separated, will be in the gaseous state. As well as treatment, it will require compression in preparation for pumping and reinjection.

Continuing with the aforesaid example, and considering two scenarios where 50% and 75% of the injected $CO_2$ is sourced from the production streams: The quantity of $CO_2$ that would have to be separated, treated and compressed would be 6000 tonnes/day of $CO_2$ and 9000 tonnes/day of $CO_2$, respectively. In volumetric terms, in the gaseous state, these equate to 3.21 million standard cubic metres/day and 4.81 million standard cubic metres/day.

The plant capability required to handle the 'recycled' $CO_2$ stream is therefore notable. Unless the oil or natural gas facility was designed originally with a view to employing $CO_2$-based EOR or EGR, the plant and equipment required for acid gas handling, and the separation, treatment, compression and pumping of such quantities of gaseous $CO_2$ may best be provided on a separate vessel designed for the purpose.

Figure 2:
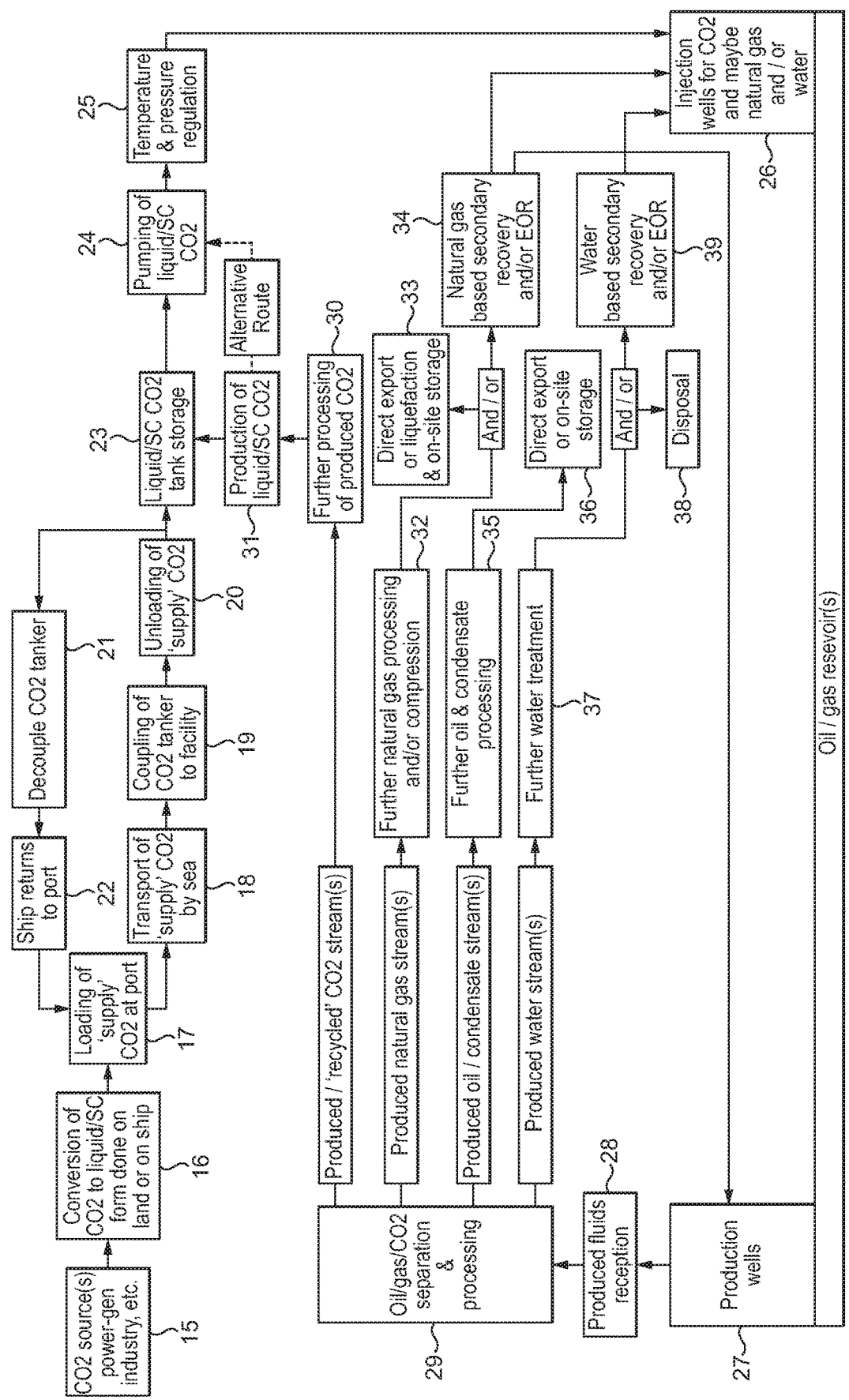
FIG. 2 is a schematic flow diagram for a system employing the teachings of the present disclosure.

Reference will now be made to FIG. 2 to explain how the teachings of the present disclosure may be integrated within the functions of the overall oil/gas asset.

$CO_2$ is produced on-shore in step 15, and converted in step 16 to liquid or super-critical $CO_2$ either on-shore or on a carrier vessel. Carrier vessels are loaded with $CO_2$ in step 17. $CO_2$ is transported by sea in step 18, and the vessel is coupled to an integrated offshore facility in step 19 for unloading of $CO_2$ in step 20. The empty carrier vessel is de-coupled in step 21, and returns to the same or another port in step 22 to be recharged with $CO_2$. Liquid or super-critical $CO_2$ is stored in step 23 in tanks integrated into the facility proper, or in tanks integrated into a separate vessel alongside and forming with the facility proper an integrated facility. Liquid or super-critical $CO_2$ is pumped from store in step 24, and its temperature and pressure regulated in step 25 before being injected in step 26 into injection wells. Production wells 27 pass fluids to produced fluids reception at 28, and thence to oil/gas/water/$CO_2$ separation and processing plant 29. Produced/recycled $CO_2$ passes from plant 29 to a further processing step 30 and thence to production of liquid or super-critical $CO_2$ in step 31 to pass to store 23 or alternatively direct to the pumping step 24 for reinjection. A produced natural gas stream from plant 29 passes via further processing and/or compression step 32 for direct export or liquefaction and on-site storage in step 33 or to a natural gas-based secondary recovery and/or EOR step 34 from which some or all of the gas is passed back to the production wells 27 to issue again in the produced fluids or is injected into the injection wells 26. A produced oil/condensate stream from the plant 29 passes to a further oil and condensate processing step 35 and thence to direct export or on-site storage in step 36. A produced water stream from plant 29 passes to a further water processing step 37 and thence either to disposal in step 38 or to a water-based secondary recovery and/or EOR/EGR step 39 for injection into the injection wells 26.

It should be understood by persons skilled in this field, without further explanation or detailed description, that in implementing the teachings of the present disclosure in practical offshore facilities, the following may be expected to be present:

Plant and equipment for the reception, separation and processing of produced fluids.

Oil, condensate and natural gas storage and or export plant and equipment.

In specific cases, equipment for the liquefaction, storage and unloading of natural gas.

Machinery such as pumps, compressors and power-gen equipment.

Control systems.

Safety systems.

Offloading equipment.

Accommodation.

One of the most attractive applications of $CO_2$-based EOR/EGR is to aging assets and those in production decline. Therefore, while the teachings of this disclosure are applicable both to new/planned and existing offshore production facilities, their application to existing ones is worthy of particular consideration.

Persons skilled in this art will readily appreciate that the adoption of methods and apparatus employing the teachings of this disclosure will avoid many of the pre-existing problems preventing widespread use of EOR and EGR techniques offshore.

There is no need to build a pipeline connecting an appropriately located onshore $CO_2$ source with offshore facilities using such $CO_2$ in $CO_2$-based EOR/EGR.

There is no need to match the quantity and variability of $CO_2$ production of the $CO_2$ 'producer' with the operational needs of the $CO_2$ 'user' (offshore facility). For example, the production of $CO_2$ by a power station may vary due to grid demand (daily, seasonal), whereas an oil production facility tends to run at a constant rate.

The further complication that the amount of $CO_2$ which the oil/gas operator may need to inject will likely vary through time—particularly during the formative stages of the application of $CO_2$-based EOR/EGR is also avoided. This variability arises because, at the beginning of the process, the reservoir will need to be 'charged' with $CO_2$. During this time the $CO_2$ being injected will be exclusively 'supplied' $CO_2$ from the onshore $CO_2$ producer. Later, previously injected $CO_2$ will be entrained in the hydrocarbons produced. At least a proportion of this entrained $CO_2$ may be separated, treated and re-injected. Consequently, as the proportions of 'supplied' and 'recycled' $CO_2$ in the injected $CO_2$ stream change, the amount of 'supplied' $CO_2$ required will also change. Accurate forecasting of the time when $CO_2$-laden hydrocarbon streams reach the producing wells (and the extent to which this will reduce the quantity of 'supplied' $CO_2$ required) is not possible. Consequently, heretofore the setting up of future $CO_2$ purchase contracts would have been difficult.

With such variability in the amount of 'supplied' $CO_2$ required by the oil/gas asset through time in addition to potential daily/seasonal changes in the supplier's rate of $CO_2$ production, setting up equitable contracts between $CO_2$ suppliers and oil/gas facility operators would have been difficult. Heretofore, damping out differences between the production rates of specific $CO_2$ suppliers and the $CO_2$ quantities required by specific oil/gas facility operators could only have been achieved by creating an expansive $CO_2$ pipeline grid connecting numerous $CO_2$ producers with numerous $CO_2$ consumers. However, to establish an expansive $CO_2$ pipeline network would require a substantial capital expenditure. This would be both expensive and time-consuming. Furthermore, such high capital expenditure would be unlikely to prove economic in mature hydrocarbon basins like the North Sea where the remaining operating life of the offshore facilities, even with EGR/EOR, is likely to prove relatively limited.

The teachings of the present disclosure transform EGR/EOR, previously considered only a theoretical possibility for mature offshore hydrocarbon basins, into a realistically deployable technology with both economic potential for oil/gas recovery and the ability simultaneously to sequester significant quantities of onshore generated $CO_2$.

Although the present teachings are particularly useful in utilising onshore generated $CO_2$, as described above, the same techniques can be employed for utilising excess $CO_2$ present in the production stream from an offshore oil or natural gas facility, which would otherwise be discharged to atmosphere or have to be piped elsewhere. $CO_2$ may be present in the production stream either because EOR/EGR was previously employed at that facility or because the related subsea reservoir contains $CO_2$ as well as useful quantities of oil or natural gas. The offshore facility in question may not be suited to EOR/EGR and so have no use for $CO_2$ entrained in its production stream. Alternatively, its production stream may have more entrained $CO_2$ than needed for EOR/EGR at that facility. In either such case, this second offshore facility serves as a $CO_2$ storage facility storing $CO_2$ in liquid or super-critical form, which can serve as a $CO_2$ source in a fashion similar to the previously described onshore sites. This $CO_2$ stored in the liquid or super-critical state may then be unloaded periodically to one or more carrier vessels for delivery to a separate integrated offshore facility such as that illustrated at 1 in FIG. 1 at which the $CO_2$ is utilised for EOR or EGR in exactly the same manner as described above.

What is claimed is:

1. A method for enhancing offshore oil recovery using carbon dioxide ($CO_2$) or for enhancing offshore gas recovery using $CO_2$ comprising the steps of:
   delivering $CO_2$ in a liquid state or a super-critical state by at least one carrier vessel from at least one $CO_2$ storage site to an offshore facility provided with at least one on-site storage unit, selected from subsea tanks or internal tanks within a hull or other floating structure of the offshore facility, and with marine transfer equipment configured to transfer $CO_2$ in said state from the carrier vessel to the on-site storage unit;
   storing the $CO_2$ in said state in the on-site storage unit; and
   utilizing the $CO_2$ from said at least one on-site storage unit for enhanced oil recovery at said offshore site or for enhanced gas recovery at said offshore site both at times when a said carrier vessel is present at said offshore facility and at times when no carrier vessel is present at said offshore facility by injecting the $CO_2$ into a sub-sea oil or natural gas bearing reservoir and recovering oil and/or natural gas from a resulting production stream;
   wherein at least a portion of the $CO_2$ delivered to said facility by said at least one carrier vessel comprises $CO_2$ from a production stream at a second offshore facility wherein said $CO_2$ is stored at the second offshore facility in the liquid or super-critical state and transferred at the second offshore facility to said at least one carrier vessel.

2. A method according to claim 1, wherein said at least one on-site storage unit comprises a separate floating storage and offloading hulled vessel without oil or natural gas production facilities that comprises said internal storage tanks.

3. A method according to claim 1, wherein said at least one on-site storage unit comprises a separate hulled vessel that is provided with:
   said internal storage tanks;
   first plant and equipment configured to process $CO_2$-laden hydrocarbon production streams, separate $CO_2$ from production fluids, and process and apply the necessary pressure and temperature regulation to $CO_2$ so that it reaches the said state; and
   second plant and equipment to achieve the requisite $CO_2$ pressure and temperature for injection into the a sub-sea oil field or a sub-sea natural gas field;
   whereby the said separate hulled vessel is configured to be supplied for enhanced recovery of oil using $CO_2$ or for enhanced recovery of gas using $CO_2$ at an offshore facility not otherwise equipped for enhanced recovery of oil or gas using $CO_2$, and is adapted to be towed away from said facility when no longer required thereat for use at a different offshore facility.

4. A method according to claim 1, wherein the offshore facility further comprises separation equipment configured for separating $CO_2$ from the production stream for direct re-injection or for storage in the at least one on-site storage unit.

5. A method according to claim 1, wherein the at least one $CO_2$ storage site comprises at least one onshore site to which $CO_2$ is delivered by at least one of pipeline, road and rail from at least one facility in which $CO_2$ is produced as a waste product; and wherein the $CO_2$ is liquefied or rendered supercritical at one of the said facility and the onshore site.

6. A method for producing oil and or gas at an offshore facility, comprising the steps of:
   separating $CO_2$ at said offshore facility from a production stream at said offshore facility,
   storing said $CO_2$ in a liquid or supercritical state in at least one on-site storage unit, selected from subsea tanks or internal tanks within a hull or other floating structure of the offshore facility, transferring CO$_2$ in said liquid or supercritical state from the at least one on-site storage unit to a carrier vessel using marine transfer equipment provided at the offshore facility, and delivering the transferred CO$_2$ to a second facility using the carrier vessel for use in enhancing offshore oil recovery using CO$_2$ or for enhancing offshore gas recovery using CO$_2$ at the second facility.

7. An offshore oil or natural gas facility provided with:

at least one on-site storage unit, selected from subsea tanks or internal tanks within a hull or other floating structure of the offshore oil or natural gas facility, adapted to store CO$_2$ in a liquid or a super-critical state;

marine transfer equipment configured to transfer CO$_2$ in said state from said at least one on-site storage unit to a carrier vessel;

recovery equipment configured to recover oil and/or natural gas from a hydrocarbon production stream;

first plant and equipment which has the capability to process CO$_2$-laden hydrocarbon production streams, separate CO$_2$ from production fluids, and to process and apply the necessary pressure and temperature regulation to the separated CO$_2$ so that it reaches said state; and second plant and equipment coupled to the first plant and equipment and to the at least one on-site storage unit, to store the separated CO$_2$ in said at least one on-site storage unit.

* * * * *